July 7, 1931.   E. WEISKER   1,813,689
PHOTOSTATIC PRINTING APPARATUS
Filed Aug. 17, 1926   2 Sheets-Sheet 2
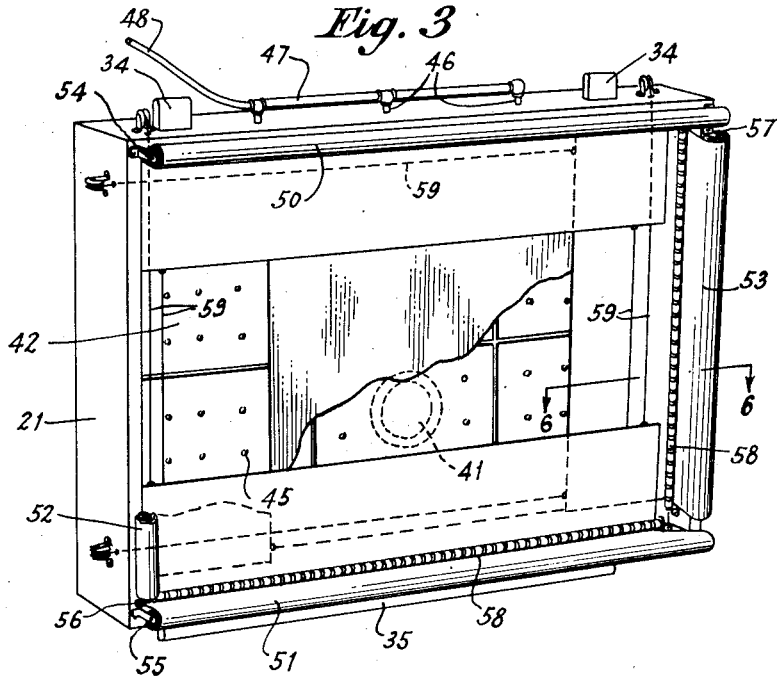
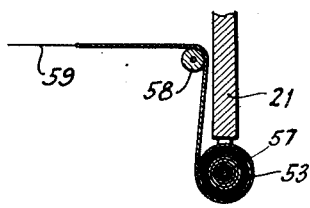
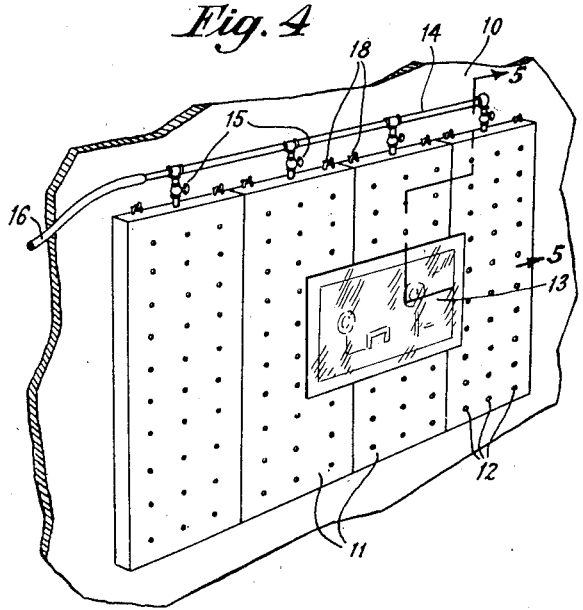
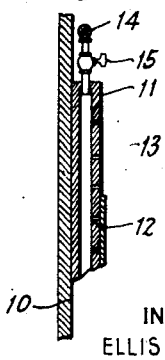
INVENTOR
ELLIS WEISKER
BY
ATTORNEY Patented July 7, 1931

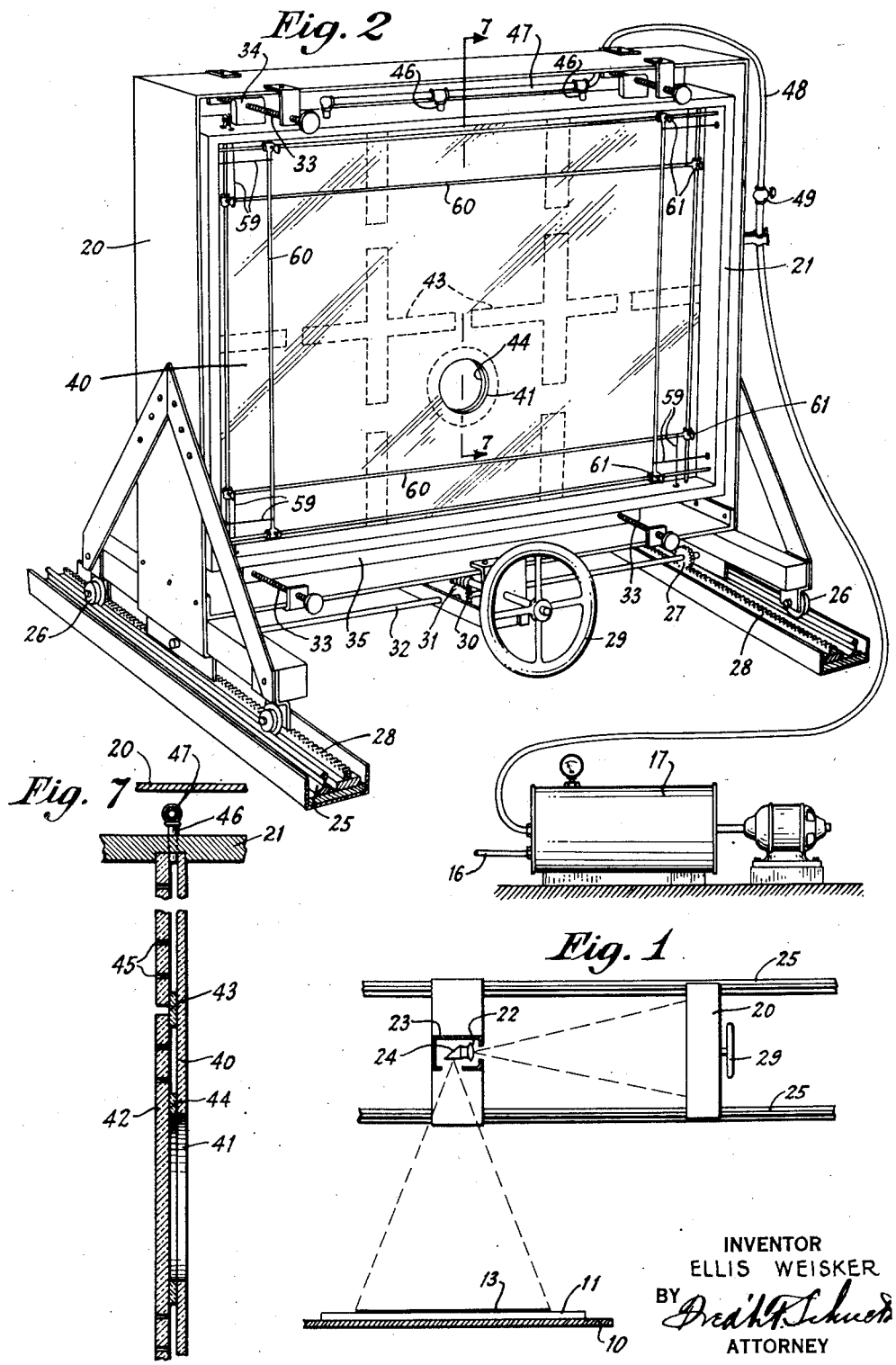

1,813,689

UNITED STATES PATENT OFFICE

ELLIS WEISKER, OF NEW YORK, N. Y.

PHOTOSTATIC PRINTING APPARATUS

Application filed August 17, 1926. Serial No. 129,684.

The invention relates to photographic apparatus, particularly of the type employed in the so-called "photostatic" work where a reproduction of copy is made directly by photographing the image upon a sensitized paper or other material or film. Heretofore, it has been the practice in the making of photostats to first properly focus the camera and then replace in the focal plane of the ground glass the box carrying sensitized material.

It is the object of the present invention to combine the focussing and the sensitized material retaining elements, making thereby unnecessary the insertion and removal of a ground glass or like member as well as the swinging or moving of the sensitized material back into place, or the use of a plate holder or the like. A further object of the invention resides in the novel apparatus embodying the foregoing features and whereby reproduction of copy in dimensions heretofore not attempted is possible and in a greatly reduced working space. The invention contemplates, also, a novel focussing element and novel means whereby the image may be framed and the degree of suction required to retain sensitized material upon its holding surface materially reduced.

The nature of the invention, however, will best be understood when described in connection with the accompanying drawings, in which—

Fig. 1 is a diagrammatic plan view illustrating the general arrangement of the photographic apparatus.

Fig. 2 is a rear view, in perspective, of the combined focussing and exposure frame mounted on a suitable trackway.

Fig. 3 is a front view, in perspective, of the box or housing member for the sensitized material.

Fig. 4 is fragmentary view in perspective of the copy-holding board employed in the apparatus.

Figs. 5, 6 and 7 are fragmentary detail sectional views taken respectively on the lines 5—5, 6—6, and 7—7, Figs. 4, 3 and 2, and looking in the direction of the arrows.

Referring to the drawings, 10 designates a support for the copy-carrying member and may be the wall of a room, for example. This carrying member is of novel design and may consist of a plurality of adjacently disposed panels 11 which are in the nature of hollow rectangular boxes or chambers whose outer face is provided with a multiplicity of perforations or openings 12 therethru, said surface being adapted to retain the copy 13. In order to hold such copy securely even in a vertical position as indicated, and especially to flatten and smooth out same properly for obtaining satisfactory reproductions therefrom, and to obviate the use of all pins, tacks and like expedients heretofore utilized for this purpose, provision is made for vacuum connections to the respective boxes or panels 11. This may be effected from a header 14 having valved inlets 15, the header being connected by means of the flexible hose 16 with a suitable vacuum pump 17. By this expedient, air may be drawn in thru the plurality of openings 12 and thus caused to effect a firm hold of the copy at a great number of points. These panels in requisite number for supporting adequately the copy 13 may be suspended as from the wall 10 on hooks 18 or the like and will thus afford a most convenient means of support for the material to be copied.

The actual copying operation is effected thru the utilization of a suitable box or housing member comprising an outer surrounding portion 20 and an inner portion 21, the latter being adapted to receive the sensitized material upon which the image of the copy is to be projected by a lens 22 carried in a suitable box 23 and associated usually with a prism 24 for receiving the image. The housing member is movably mounted for travel as a unit along a track 25; and for this purpose is provided at each side with pairs of rollers 26 resting upon the track 25 and also with pinions 27 engaging corresponding stationary and longitudinally disposed racks 28, whereby said housing may be adjusted along the tracks in focussing. A hand wheel 29 operating a worm 30 which meshes with a worm wheel 31 on the pinion shaft 32 may conveniently be actuated to rotate said pinions and effect the adjustment necessary to bring the housing into properly focussed position.

The housing proper, as stated, comprises the outer box like portion 20 and the inner portion 21, the latter being capable of slight movement relatively to the other to accurately set the ground glass parallel to the copy to be photographed. This setting is effected by pairs of oppositely disposed screws 33 which are carried at opposite sides of the box and are arranged to have their ends bear at the top against lugs 34 upwardly directed from the top of the inner box 21 and at the bottom against a transverse strip 35 downwardly directed from the bottom of said inner box and resting also on the bottom of the box 20. By loosening one screw of a pair and moving inwardly the other, the inner box 21 may readily be brought into a plane parallel to that of the copy.

The said housing member 21 comprises, also, the novel focussing element which consists, as shown, of a rear plate of transparent glass 40 thru which is cut a sight aperture 41, preferably circular and of a size sufficient for determining more sharply when the image is in proper focus. A front plate 42 of ground glass, or rather a number of sections, is secured to the plate 40 and is of the character usually employed in focussing an image. This ground glass plate, in view of the large dimensions contemplated, and because also of the large number of small perforations to be provided therein, is preferably constructed in sectional form as indicated. The said ground glass plate, or the sections thereof, are secured to the plate 40 as by intermediate transparent glass strips 43, which are cemented or bolted thereto, serving also to afford a shallow air chamber therebetween which is suitably closed along the edges, and also at the aperture 41 as thru an intermediate annular washer 44 of transparent glass which is cemented to the two plates. The air chamber thus provided has communication with the outside atmosphere only thru perforations or openings 45 in the inner plate 42; and vacuum connections 46 are provided thereto as from a header 47 which is connected by a flexible hose 48 with the vacuum pump 17 thru a controlling valve 49 whereby the degree of vacuum to be applied may be regulated to suit. The purpose of the vacuum thus provided in the air chamber formed between the two plates is to permit of retaining the sensitized material, upon which a reproduction is to be made, firmly to the outer face of the inner plate 42 and substantially in the correct focal plane previously ascertained. It will be apparent that the image focussed on the ground glass plate 42 will be clearly visible at the back plate 40 though it is necessary at some portions to view it thru several additional thicknesses of glass. For extremely sharp focussing, a limited portion of the image may be viewed directly on the ground glass by looking thru the sight aperture 41.

Provision is made, also, for framing the image by independent curtains or screens 50, 51, 52 and 53 which are carried by corresponding spring rollers 54, 55, 56 and 57 mounted along the sides and the top and bottom edges of the box 21, the said curtains being brought under series of guide rollers 58. Cords 59 are connected to the free edges of a curtain and are then brought thru the walls of the box to connect with movable rods 60, two of which are slidably mounted for movement across the back of the box and two for up and down movement thereover. Clamping screws 61 are provided for said rods and serve to secure the same in adjusted position. In this manner, the various curtains may be drawn over the front of the ground glass plate 42 to provide a window or frame for the image, the dimensions of which may readily be ascertained and the sensitized material cut accordingly and then held to the plate. It will be appreciated, also, that by thus being able to bring the curtain over all of the surface of the plate 42 except that required for the exposure, the said curtains frame the picture and serve to close off as well a corresponding number of the openings 45 thru the plate and thereby materially reduce the vacuum required or increase its intensity at the exposure portion where the sensitized material is to be held. It will be noted that the sensitized material may be located at any convenient or desired portion of the plate 42, the curtains being correspondingly adjusted to the portion selected. It will be understood, furthermore, that in view of the fact that the usual bellows member between the lens and ground glass is omitted to permit free access to the latter, the said ground glass is always exposed and suitable provision must be made for excluding therefrom the actinic rays of light, other than those brought thereto thru the lens, when an exposure is to be made.

I claim:—

1. In photographic apparatus: a combined focussing and sensitized material retaining member, comprising a transparent plate, a ground glass plate, intermediate sealing means separating the two plates and affording a sealed air chamber therebetween, said glass plate having openings therethru, and a vacuum connection to said chamber.

2. In photographic apparatus: a combined focussing and sensitized material retaining member, comprising a transparent plate, a ground glass plate in sectional form, intermediate sealing means separating the two plates and affording a sealed air chamber therebetween, said glass plate having openings therethru, and a vacuum connection to said chamber.

3. In photographic apparatus: a combined focussing and sensitized material retaining member, comprising a transparent plate, a ground glass plate provided with a plurality of openings therethru, transparent spacing sealing strips between said plates to provide an intermediate sealed air chamber, and a vacuum connection to said chamber.

4. In photographic apparatus: a combined focussing and sensitized material retaining member, comprising a transparent glass plate having a sight opening therethru, a ground glass plate, intermediate sealing means separating the two plates and affording a sealed air chamber therebetween, said glass plate having openings thereto, and a vacuum connection to said chamber.

5. In photographic apparatus: a combined focussing and sensitized material retaining member, comprising a transparent glass plate having a sight opening therethru, a ground glass plate provided with a plurality of openings therethru, transparent glass spacing sealing strips between said plates to provide an intermediate sealed air chamber, an annular glass washer about said sight opening to seal the air chamber at the sight opening, and a vacuum connection to said chamber.

6. In photographic apparatus: a combined focussing and sensitized material retaining member, comprising a transparent plate, a ground glass plate, intermediate sealing means separating the two plates and affording a sealed air chamber therebetween, said glass plate having openings therethru, means to cover a predetermined portion of said ground glass plate, and a vacuum connection to said chamber.

7. In photographic apparatus: a combined focussing and sensitized material retaining member, comprising a transparent plate, a ground glass plate, intermediate sealing means separating the two plates and affording a sealed air chamber therebetween, said glass plate having openings therethru, means to cover the ground glass surface except the focussed area thereof, and a vacuum connection to said chamber.

8. In photographic apparatus: a combined focussing and sensitized material retaining member, comprising a transparent plate, a ground glass plate, intermediate sealing means separating the two plates and affording a sealed air chamber therebetween, said glass plate having openings therethru, curtains movable over the surface of the ground glass, and a vacuum connection to said chamber.

9. In photographic apparatus: a combined focussing and sensitized material retaining member, comprising a transparent plate, a ground glass plate, intermediate sealing means separating the two plates and affording a sealed air chamber therebetween, said glass plate having openings therethru, curtains movable over the surface of the ground glass, means movable over the outer surface of the transparent plate and connected with the curtains to adjust the same over the ground glass, and a vacuum connection to the said air chamber.

10. In photographic apparatus: a combined focussing and sensitized material retaining member, comprising a transparent plate, a ground glass plate, intermediate sealing means separating the two plates and affording a sealed air chamber therebetween, said glass plate having openings therethru, curtains movable over the surface of the ground glass, means movable over the outer surface of the transparent plate and connected with the curtains to adjust the same over the ground glass, means to lock said movable means in adjusted position of the curtains, and a vacuum connection to the said air chamber.

11. In photographic apparatus: a combined focussing and sensitized material retaining member, comprising an outer frame and an inner frame, the latter having a transparent plate and a ground glass plate, intermediate sealing means separating the two plates and affording a sealed air chamber therebetween, said glass plate having openings therethru, and a vacuum connection to the said air chamber.

12. In photographic apparatus: a combined focussing and sensitized material retaining member, comprising an outer frame and an inner frame, the latter having a transparent plate and a ground glass plate, intermediate sealing means separating the two plates and affording a sealed air chamber therebetween, said glass plate having openings therethru, means to set the inner frame relatively to the outer, and a vacuum connection to the said air chamber.

13. In photographic apparatus: a combined focussing and sensitized material retaining member, comprising an outer frame and an inner frame, the latter having a transparent plate and a ground glass plate, intermediate sealing means separating the two plates and affording a sealed air chamber therebetween, said glass plate having openings therethru, means to set the inner frame relatively to the outer, means to move both of said frames as a unit for focussing, and a vacuum connection to the said air chamber.

14. In photographic apparatus: a combined translucent focusing element and sensitized material retaining member; and means operable from the rear of said member to outline an image focussed thereon.

15. In photographic apparatus: a combined translucent focusing element and sensitized material retaining member; vacuum means to retain sensitized material on one surface of said member; and means to outline an image focussed thereon.

16. In photographic apparatus: a combined focusing element and sensitized material retaining member, comprising a plate of ground glass, and means to outline on the ground surface of said ground glass an image focussed thereon.

In testimony whereof I affix my signature.

ELLIS WEISKER.